(Model.)
O. O. NEWBERRY.
SULKY.
No. 283,916. Patented Aug. 28, 1883.
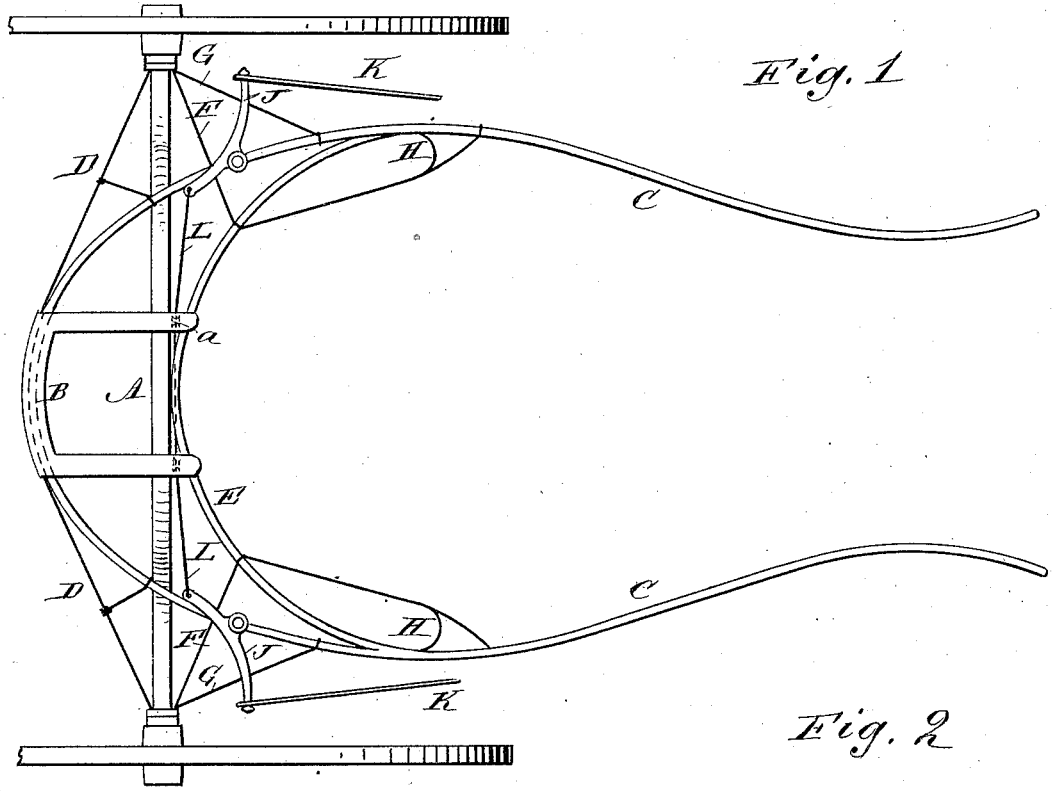
Fig. 1
Fig. 2
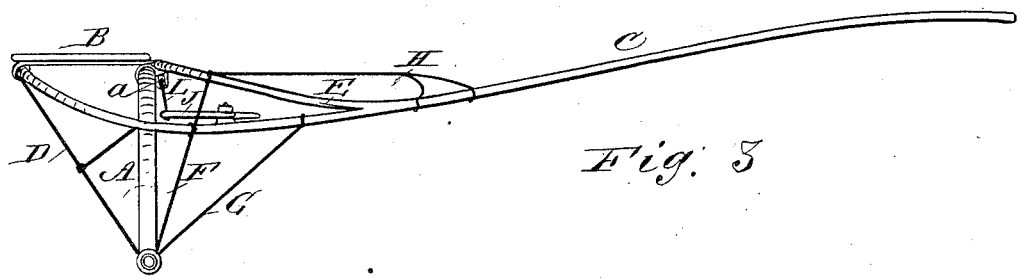
Fig. 3
Fig. 4
WITNESSES:
C. Neveux
C. Sedgwick
INVENTOR:
O. O. Newberry
BY Munn & Co
ATTORNEYS.

UNITED STATES PATENT OFFICE.

ORSON O. NEWBERRY, OF VINCENNES, IOWA.

SULKY.

SPECIFICATION forming part of Letters Patent No. 283,916, dated August 28, 1883.

Application filed December 4, 1882. (Model.)

*To all whom it may concern:*

Be it known that I, ORSON O. NEWBERRY, of Vincennes, in the county of Lee and State of Iowa, have invented a new and Improved Sulky, of which the following is a full, clear, and exact description.

The object of my invention is to provide a new and improved sulky, which is very light, strong, stiff, and durable, and is composed of less parts than the sulkies in use heretofore.

Reference is to be had to the accompanying drawings, forming part of this specification, in which similar letters of reference indicate corresponding parts in all the figures.

Figure 1 is a plan view of my improved sulky. Fig. 2 is a longitudinal elevation of the same, the wheels being detached. Fig. 3 is a rear elevation of the same, the wheels being detached.

The axle A and cross-bar E are bent or curved upward at the middle to such an extent that the seat B can be secured directly on the axle and the cross-bar E, and thereby the struts for supporting the seat from the axle can be dispensed with. The front end of the seat B rests on the axle and the cross-bar E, and the rear end rests on the curved rear ends of the shafts C, which are united under the rear end of the seat, the said rear ends of the shafts being curved upward sufficiently to support the seat, as shown in Figs. 2 and 3. Brace-rods D extend from the rear part of the seat to the ends of the axle. Brace-rods F and G extend from the ends of the axle to the shafts and to the cross-bar. Foot-rests H are formed on the inner sides of the shafts by rods attached to the shafts and to the cross-bar E. An angle or curved lever, J, is pivoted to each shaft C, directly in front of the axle, and to the outer ends of the said angle-levers the traces K are hitched. The inner ends of the levers J are connected by a strap, L, which runs over small pulleys *a* on the bottom of the seat, to prevent undue wearing of the said strap.

As the axle and cross-bar E are curved upward at the middle, the horse can under no circumstances strike its hocks against any parts of the sulky.

The hitching-levers J and the strap L equalize the draft and subdivide the strain of the draft equally. By taking the strap out of the rollers and letting it pass straight across from one hitch to the other it forms a rest for the horse's tail. The tail need not be tucked up close to the horse as it need be if other sulkies are used. As many of the stays, braces, and clips and bolts can be dispensed with, the sulky can be made very light, and at the same time will be strong and durable.

Having thus described my invention, what I claim as new, and desire to secure by Letters Patent, is—

. The levers J J, connected by a strap, L, and fulcrumed on the shafts C C, to hold the traces on the outside of the shafts, as shown and described.

ORSON O. NEWBERRY.

Witnesses:
J. FRANK SMITH,
NANNIE M. SMITH.